United States Patent
Veiga et al.

(10) Patent No.: US 6,455,449 B1
(45) Date of Patent: Sep. 24, 2002

(54) COATED MULTI-DENIER MIXED FABRICS FOR USE IN INFLATABLE VEHICLE RESTRAINT SYSTEMS

(75) Inventors: Manuel J. Veiga, Tewksbury; Richard J. Satin, Swampscott, both of MA (US)

(73) Assignee: Bradford Industries, Inc., Lowell, MA (US)

( * ) Notice: Subject to any disclaimer, the term of this patent is extended or adjusted under 35 U.S.C. 154(b) by 0 days.

(21) Appl. No.: 09/389,711

(22) Filed: Sep. 3, 1999

(51) Int. Cl.[7] .................................................. B32B 5/08
(52) U.S. Cl. ........................ 442/218; 442/60; 442/76; 442/79; 442/85; 442/86; 442/203; 442/208; 442/209; 442/210; 442/211; 442/212; 442/213; 442/214; 442/215; 442/216; 442/217; 442/219; 442/220; 280/728.1; 280/729; 280/736; 280/742; 280/737; 428/36.91
(58) Field of Search ....................... 442/60, 76, 79, 442/85, 86, 208, 203, 209, 210, 211, 212, 213, 214, 215, 216, 217, 218, 219, 220; 280/728.1, 729, 736, 742, 737; 428/36.91

(56) References Cited

U.S. PATENT DOCUMENTS

| | | | |
|---|---|---|---|
| 4,143,197 A | * | 3/1979 | Jasionowicz et al. ........ 428/225 |
| 4,284,682 A | | 8/1981 | Tschirch et al. |
| 4,560,611 A | * | 12/1985 | Naka et al. .................. 428/266 |
| 5,110,666 A | | 5/1992 | Menzel et al. |
| 5,178,938 A | | 1/1993 | Magistro et al. |
| 5,226,671 A | | 7/1993 | Hill |
| 5,240,765 A | | 8/1993 | Takahashi et al. |
| 5,254,621 A | | 10/1993 | Inoue et al. |
| 5,258,211 A | | 11/1993 | Momii et al. |
| 5,298,317 A | | 3/1994 | Takahashi et al. |
| 5,399,402 A | | 3/1995 | Inoue et al. |
| 5,514,431 A | | 5/1996 | Shimomura |
| 5,630,620 A | | 5/1997 | Hirai et al. |
| 5,632,057 A | | 5/1997 | Lyden |
| 5,647,079 A | | 7/1997 | Hakamim et al. |
| 5,650,207 A | * | 7/1997 | Crouch ....................... 428/36.1 |
| 5,651,395 A | | 7/1997 | Graham et al. |
| 5,704,402 A | | 1/1998 | Bowen et al. ............... 139/389 |
| 5,707,711 A | | 1/1998 | Kitamura |
| 5,721,046 A | | 2/1998 | Shrewsburg |
| 5,863,644 A | | 1/1999 | Bonigk et al. ............... 428/221 |
| 5,881,776 A | | 3/1999 | Beasley, Jr. .................. 139/389 |
| 5,921,287 A | | 7/1999 | Bowen et al. |
| 6,037,279 A | | 3/2000 | Brookman et al. |

OTHER PUBLICATIONS

Publication of Clark–Schwebel Joint Ventures, C–S Interglas A.G., title page, Clark–Schwebel Description page, Contents, Disclaimer page, Parameters for Woven Fabric Selection—2 pages.

* cited by examiner

Primary Examiner—Terrel Morris
Assistant Examiner—Arti Singh
(74) Attorney, Agent, or Firm—Hollander Law Firm, P.L.C.

(57) ABSTRACT

A coated woven textile fabric is disclosed which is formed of synthetic yarns of more than one denier preferably synthetic filamentary yarns of differing deniers. A polymeric coating such as polyurethane is layered on at least one side thereof, but may also be provided on both sides. The combination of yarns of different deniers provides a superior adhesion surface for the polymeric coating. The yarns and the polymeric coating are preselected respectively in deniers and thickness so as to render the fabric substantially impermeable to fluid under pressure, while maintaining superb packageability and antiblocking properties for use in vehicle occupant restraint systems. A flexible lightweight air bag for receiving and containing fluid under pressure for use in a vehicle air restraint system is also disclosed, incorporating the woven textile fabric of the invention.

35 Claims, 3 Drawing Sheets

COATED MULTI-DENIER MIXED FABRICS FOR USE IN INFLATABLE VEHICLE RESTRAINT SYSTEMS

BACKGROUND OF THE INVENTION

1. Field of the Invention

This invention relates to coated multi-denier mixed woven textile fabrics for use in inflatable vehicle occupant restraint systems and, more particularly, to coated textile fabrics woven with fibers and yarns of different materials and denier sizes in either or both of the warp and fill directions to provide air bags and side curtains with improved physical characteristics.

2. Description of the Related Art

Current restraint systems for automotive vehicles include driver and passenger side air bags that are instantaneously gas-inflated by means such as by explosion of a pyrotechnic material at the time of a collision to provide a protective barrier between vehicle occupants and the vehicle structure. Much of the impact of a collision is absorbed by the air bag, thus preventing or lessening the possibility of serious bodily injury to occupants of the vehicle. Such air bags are located, typically, in a collapsed, folded condition housed in the steering wheel, to protect the driver, and in the dashboard, to protect a passenger seated next to the driver. Recently, the automotive industry also has introduced air bags that are stored in the back of the front seats or in the rear seats to protect the cabin occupants in the event of a collision occurring on either side of the vehicle.

More recently still, a further safety feature that is made available for passenger vehicles, especially the so-called sport utility vehicles or SUVs, are side-impact protective inflatable side curtains designed to provide a cushioning effect in the event of side collisions or rollover accidents. These side curtains are stored in the roof of the vehicle and, in the event of a collision, deploy along the interior side walls of the SUV's cabin.

Each of these different types of air bags has different design and physical property requirements, such as gas (air) holding permeability, air pressure and volume, puncture resistance and adhesion of the coating material to a woven substrate. For example, driver side air bags must have little or no permeability and, as a result, are often made from a material having very little or no permeability. Passenger side air bags, on the other hand, require a controlled permeability, and are most often made from materials having some degree of permeability. Furthermore, all such vehicle air restraint devices must have superior packageability and anti-blocking qualities. Packageability refers to the ability for a relatively large device to be packaged in a relatively small space. Anti-blocking refers to the ability of the device to deploy almost instantaneously without any resistance caused by the material sticking to itself.

The air holding capability of side curtains is critical since they must remain inflated for an extended period of time to protect passengers in multiple rollovers. Unlike air bags which are designed to inflate instantaneously, and to deflate almost immediately after inflation in order to avoid injury to the driver and front seat passenger, air curtains used in SUVs, or in ordinary passenger vehicles, must be capable of remaining inflated in the range of from about three (3) to about twelve (12) seconds, depending upon the size of the curtain and the type of vehicle. An average passenger vehicle would require a side curtain of from about 60 inches to about 120 inches in length as measured along the length of the vehicle, and a larger vehicle, such as a minivan, would require an even longer side curtain. The maximum inflation period of a side curtain should be sufficient to protect the cabin occupants during three (3) rollovers, the maximum usually experienced in such incidents.

When such air bags are deployed, depending upon their specific location or application, they may be subjected to pressures within a relatively broad range. For example, air bag deployment pressures are generally in the range of from about 50 kilopascals (kpa) to about 450 kpa, which corresponds generally to a range of from about 7.4 (pounds per square inch) psi to about 66.2 psi. Accordingly, there is a need for fabric products and air bags which can be made to be relatively impermeable to fluids under such anticipated pressures while being relatively light in weight.

One means of improving air holding capability in vehicle restraint systems has been through coatings such as chloroprene and silicone rubber coatings, applied to the textile substrate. Wherever coated fabrics are used there exists the problem of insufficiency of adhesion of the coating to the fabric substrate. More particularly, the smoother the substrate surface, generally the more difficult it is to obtain strong adhesion of the coating material to the substrate. Furthermore, with some coatings such as silicone rubber, radio frequency (RF) heat sealing techniques cannot be used to form the bag. Thus in such instances bags are usually made by stitching, a process which requires the addition of an adhesive sealant in the stitched areas.

There have recently been developed improved polyurethane, acrylic, polyamide and silicone coatings that are coated in layers on the fabric substrates. It has been found that adhesion characteristics are greatly improved with such layered coatings. Examples of such coated fabrics and methods of coating such fabrics are disclosed in commonly assigned application Ser. Nos. 09/327,243, 09/327,244 and 09/327,245, filed Jun. 7, 1999, the disclosures of which are incorporated herein by reference and made a part of this disclosure.

In general, yarn sizes are measured by a well known weight indicator referred to as "denier" and identified as units "D". The greater the denier (D), the thicker and heavier is one unit of length of the yarn. The most common denier yarns presently used in such air holding devices are 420D nylon, in a 46×46 or 49×49 count weave, for driver side air bags, and 630D nylon, in a 41×41 count weave, for passenger side air bags. However, deniers as low as 210D, in a 72×72 count weave, have been used where the air bag must be housed in a tight fit, and, to a lesser extent, a 315D yarn, in a 60×60 count weave.

U.S. Pat. No. 5,704,402 discloses an uncoated air bag fabric in which weave constructions are stated to provide air bags with air permeability which does not increase by more than about fifty percent from the untensioned state when the fabric is subjected to tensile forces. These textile fabrics are stated to include yarns of different deniers within the weaves. Air bags of this type are typically used as passenger side air bags and are unsuitable for use in driver side air bags or side curtains, which must have little or no air permeability.

U.S. Pat. No. 5,863,644 discloses woven or laid structures using hybrid yarns comprising reinforcing filaments and lower melting matrix filaments composed of thermoplastic polymers to form textile sheet materials of adjustable gas and/or liquid permeability. During the formation of textile fabrics in accordance with the disclosure, polyester fibers in the weaves are melted by the application of heat to form textile sheet materials which are stated to have predetermined gas and/or liquid permeability.

U.S. Pat. No. 5,881,776 relates to a rapier woven low permeability air bag fabric and an air bag for use in a motor vehicle. The fabric is of plain weave construction and has an air permeability of less than approximately 5.0 CFM. The air bag is comprised of a plurality of panels connected together about their respective peripheries.

While these known fabrics represent somewhat successful attempts to control permeability through the incorporation of one or more features, none of these attempts have adequately solved the problem of providing a fabric of adequate impermeability whereby controlled permeability may be incorporated, where required. The present invention relates to a mixed woven coated textile fabric having yarns of different denier sizes woven for use in such inflatable air bag or side curtain restraint systems which not only provides improved adhesion of the coating to the textile substrate, but more effectively limits permeability and provides enhanced physical properties of the woven substrate, yet leaving available controlled permeability through the use of selectively sized venting apertures or other means.

SUMMARY OF THE INVENTION

It has been found that by weaving yarns of different deniers, as for example, a low denier yarn with a higher denier yarn of the same or different continuous filamentary or fibrous materials in either or both of the warp or fill directions, coating adhesion and other physical properties of the woven textile fabric are greatly improved. In particular, if for example, nylon yarns of different deniers are interwoven, the difference in deniers creates an uneven, or relatively rough surface to which polymer coatings will adhere more securely than if the surface were smooth. Further, if nylon yarns of one denier are interwoven with, for example, yarns of a different denier and different fiber material, such as aramid fiber, the woven textile fabric would not only have greater adhesion capability for coatings, but would also have increased puncture resistance properties. In addition, the use of low denier yarns woven with high denier yarns greatly improves the packageability of the air bag or side curtain for storage, while reducing the weight of the bag. Broadly stated, fabrics for such air bags generally can weigh from about 4.0 ounces per square yard (osy) to about 10.0 ounces per square yard (osy). In actual use, however, on the average, fabrics for such air bags generally weigh from about 5 to about 6 ounces per square yard. It has now been found that by combining different size and types of yarns in a single fabric weave, the strength and weight of the resultant fabric can be selectively controlled. For example, yarns of a given denier can be utilized in the warp with yarns of a lesser denier in the fill direction. Also, the warp yarns can be comprised of yarns of different deniers in an alternating regular or random fashion and the fill yarns can be comprised of yarns of the same denier or of varying or alternating deniers. Moreover, individual yarns can be comprised of continuous filaments of varying sizes blended together, or blended with other natural or synthetic fibers to control the final strength and weight factors inherent in the final fabric product. As will be seen hereinbelow, such combinations provide not only strength and weight benefits, but also surface adhesion properties for coating the fabrics to render them substantially impermeable to fluid pressure.

A coated woven textile fabric is disclosed, which comprises synthetic yarns of more than one denier, and a polymeric coating on at least one side thereof, the yarns and the polymeric coating being preselected respectively in deniers and thickness so as to render the fabric substantially impermeable to fluid under pressure. According to one preferred embodiment the fabric is comprised of warp yarns of about 315D nylon and fill yarns of about 210D nylon. According to another embodiment the fabric is comprised of warp yarns of about 420D nylon and fill yarns of about 315D nylon. According to yet another embodiment the fabric is comprised of warp yarns of from about 315D to about 420D nylon and fill yarns of from about 195D to about 380D aramid.

An embodiment of the invention is disclosed wherein the fabric is comprised of warp yarns of more than one denier and fill yarns of more than one denier. This fabric may be comprised of warp yarns of from about 210D to about 315D nylon and fill yarns of about 210D nylon, and the yarns are selected from the group consisting of nylon, polyester, aramid and graphite and combinations thereof.

The coating on at least one side of the fabric is preferably a thin polyurethane layer, but may also be comprised of polysiloxane, polyamide or acrylic type polymers. The same or an alternative coating may be provided on the other side of the fabric. It has been found that the coated fabric according to the invention provides excellent fluid impermeability while retaining packageability and anti-blocking qualities.

A flexible lightweight air bag for receiving and containing fluid under pressure for use in a vehicle air restraint system is also disclosed, which comprises a textile fabric according to the invention which is woven of synthetic yarns of more than one denier, and has a polymeric coating on at least one side of the fabric. The yarns and the polymeric coating are preselected respectively in deniers and thickness so as to render the air bag capable of receiving and retaining fluid under pressure in a vehicle air restraint system. The polymeric coated fabric is substantially impermeable to the fluid.

The coating on at least one side of the fabric is preferably a thin polyurethane layer, but may also be comprised of polysiloxane, polyamide or acrylic type polymers. The same or an alternative coating may be provided on the other side of the fabric forming the air bag. It has been found that the fabric according to the invention provides excellent fluid impermeability while retaining packageability and anti-blocking qualities.

BRIEF DESCRIPTION OF THE DRAWINGS

Preferred embodiments of the invention are described hereinbelow with reference to the drawings, wherein.

DETAILED DESCRIPTION OF THE INVENTION

Figure 1:
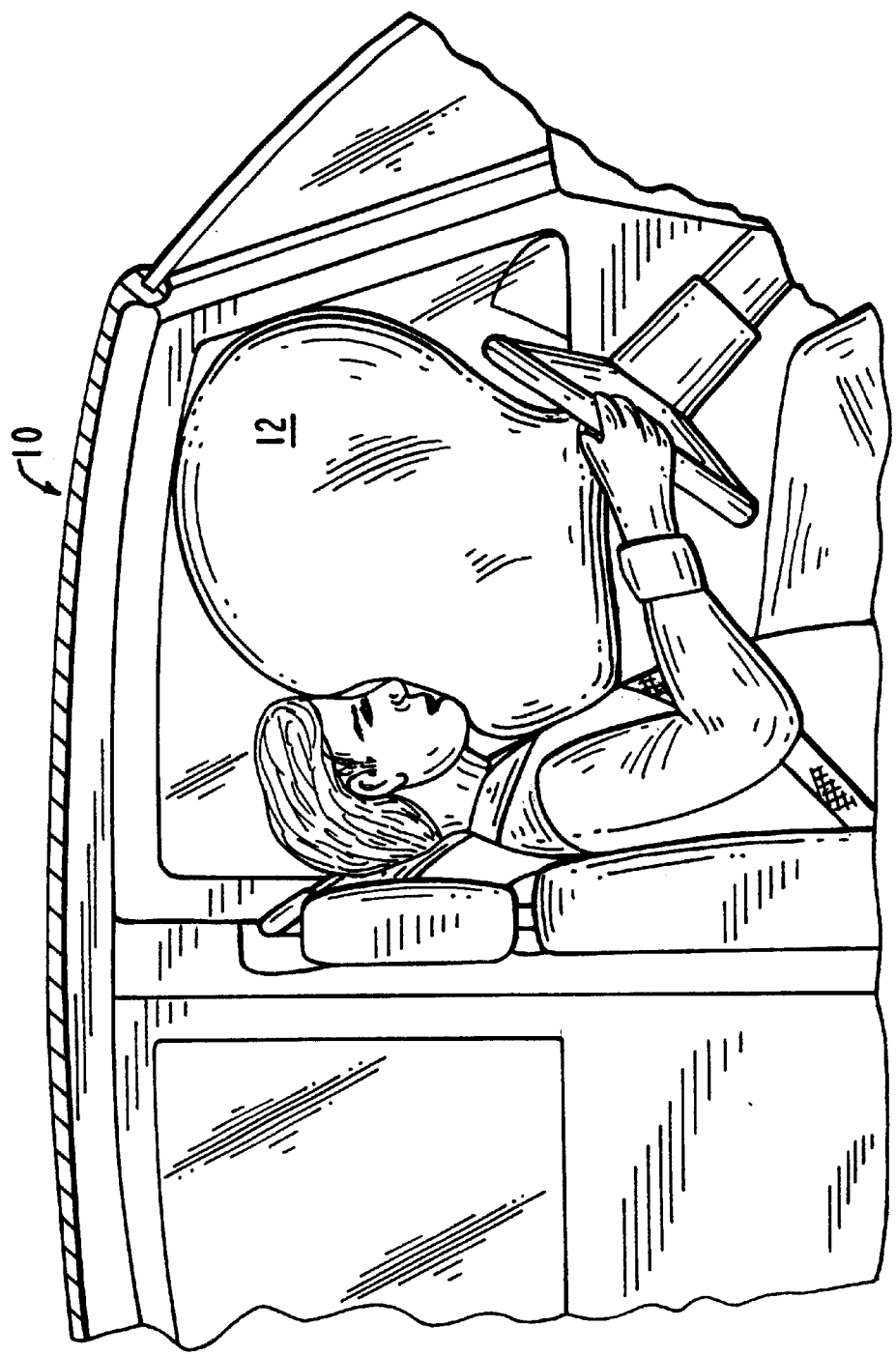
FIG. 1 is a partial cross-sectional side elevational view of a driver's side of an automobile showing a deployed air holding restraint bag made of the lightweight textile fabric constructed according to the present invention.

According to the present invention it has been found that coated multi-denier mixed woven textile fabrics for use in inflatable air bags or side curtains, whether of the same or different materials, provide greatly improved coating adhesion and other desired physical properties over a textile fabric woven from yarns of the same denier. In particular, it has been found that a combination of woven yarns of differing deniers form a fabric having ridges and valleys in the weave which provide a much greater surface area for adhesion of synthetic polymeric coatings to the woven substrate which, in turn, increases the adhesion of the coating material to the woven fabric substrate. Further, the textile material of the present invention can be woven to specific tensile strength or puncture resistance requirements by selectively increasing or decreasing the denier sizes of the yarns or by introducing puncture resistant or other types of materials into the weave.

Although the preferred textile materials for use in air bags are yarns of nylon and polyester, other synthetic materials can be used according to the invention. For example, aramid yarns such as Kevlar®, produced by E. I. DuPont de Nemours & Company, Spectra® produced by Allied Signal Corporation, or PBI®, produced by Celanese Corporation, can be used in the weave. Non-polymeric materials such as graphite, natural fibers or blends of natural fibers such as cotton, and synthetic filaments such as polyester can also be used to advantage in the weave. It has been found that woven combination fabrics that incorporate aramid yarns provide greater puncture protection to the side curtain where danger from broken glass exists. Weave combinations, such as nylon and cotton, for example, can also be used to create different physical properties, such as providing additional flexibility to the coated fabric. Weaves of aramid yarns alone may also be used in the invention. In general, the synthetic yarns are each formed of bundles of continuous filaments temporarily held together for weaving by a suitable sizing compound such as polyvinyl alcohol, which also provides lubricity for weaving. After weaving, the sizing compound is generally removed from the fabric by a known scouring process. Polymeric coated fabrics for uses in air-holding vehicle restraint systems and methods of coating such fabrics are disclosed in the aforementioned commonly assigned application Ser. Nos. 09/327,243, 09/327,244 and 09/327,245, filed Jun. 7, 1999, which are incorporated herein by reference.

When the woven textiles of the present invention are coated as, for example, with polyurethane, silicone rubber, polysiloxane, or polyamide and acrylic type polymers, the air holding characteristics of the woven textile can be adjusted as required such as by vents or other appropriate means for the particular application involved. This allows for the use of different denier materials to be used for the driver side and front passenger type air bags than those that are used for the side curtains. Also, the thickness of the polymeric coating can be pre-selected to be combined most effectively with yarns of differing and preselected deniers to provide a coated fabric which is most effective in terms of pressure fluid impermeability, packageability, puncture resistance and the like.

The yarns of the present invention can be of deniers ranging from about 70D to about 1200D to produce products having weave counts of from about 20 to about 150 yarns per inch. Textile weights can range from about 4.0 to about 10.0 ounces per square yard (osy). These types of multi-denier weave combinations exhibit improved tear resistance and adhesion on lightweight denier textiles to be used in air bag and side curtain applications. Higher denier nylon and aramid yarns provide greater tear resistance. In addition, these types of denier combinations and constructions can be woven with unsized yarns utilizing LDPF (low denier per filament) Hi-tenacity yarns, manufactured by DuPont, or with high shrinkage yarns. The woven textiles of the invention can also be blends of aramid yarn with nylon, polyester or other synthetic yarns.

For purposes of this invention, weaves of different types are contemplated, such as, for example: plain weaves, consisting of yarns in an alternating fashion, one over and one under every other yarn; basket weaves, in which two or more warp yarns are alternately interlaced over and under each other; leno yarns, in which the yarns are locked in place by crossing two or more warp threads over each other and interlacing with one or more filling threads; twill weaves, characterized by a diagonal rib created by one warp yarn floating over at least two filling yarns; four harness satin weave where a filling yarn floats over three warp yarns and under one; an eight harness satin weave, which is similar to the four harness satin weave except that one filling yarn floats over seven warp yarns and under one; and high modulus weave where high impact resistance and high strength are required. Detailed descriptions of such weaves are described in textile publications such as a publication of Clark-Schwebel Joint Ventures, CS-Interglas A.G., the disclosure of which is incorporated herein by reference.

A preferred construction for the multi-denier weave of the invention is a plain weave of 315D×420D nylon, with a weave count of 46×46. A weave of this construction has been found to provide greatly improved adhesion characteristics, better packageability and excellent tensile strength. As disclosed herein, other deniers can be used within the ranges specified to provide the advantages of the invention. Similarly, when a combination of different yarns is used in the weave, such as nylon and aramid yarns, the preferred weave would be a warp nylon of 315D or 420D with a 195D or 380D Kevlar® yarn. In general, it has been found that by combining low denier yarns with high denier yarns, the lower denier yarns reduce the weight of the fabric, yet the fabric retains the benefits of strength and weight through the high denier yarns incorporated therein.

Referring now to FIG. 1, there is shown a partial cross-sectional side elevational view of a driver's side of an automobile 10 showing a deployed air restraint bag 12 made of a lightweight coated fabric constructed according to the present invention. The air bag is preferably constructed of a plain weave fabric as will be described hereinbelow, coated on one side with a thin layer of polyurethane. The coating is preferably 0.001 to 0.010 inch in thickness (i.e., 1–10 mils), but may be up to about 0.020 inch in thickness (i.e., 20 mils) without substantially compromising packageability. The air restraint bag shown is exemplary of a driver's side air bag which is deployed from the steering column of the vehicle. Although not shown, as noted previously, air restraint systems including side curtains are also contemplated within the scope of the invention.

Figure 2:
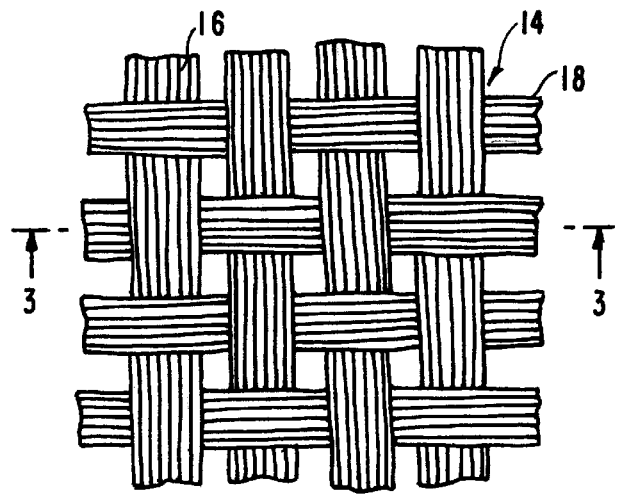
FIG. 2 is a greatly enlarged, partial schematic representation of a lightweight woven fabric of the invention, comprised of nylon yarns of different deniers.
Figure 3:
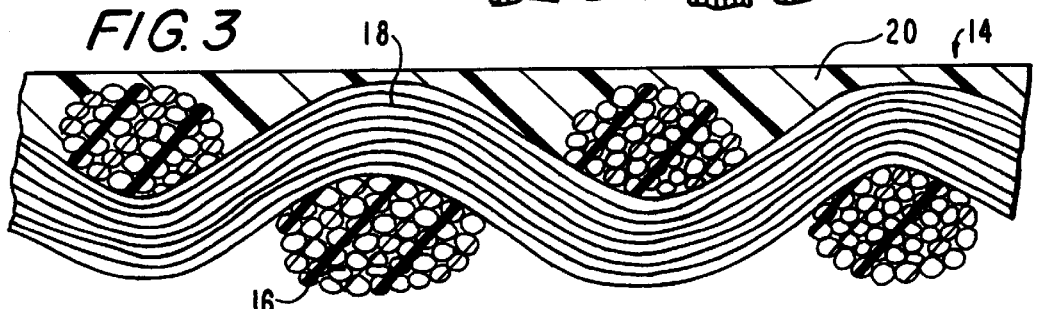
FIG. 3 is a cross-sectional view of the fabric of FIG. 2, taken along line 3—3 of FIG. 2, with a polymeric coating added to one side thereof.

One preferred embodiment of the invention, is shown in FIG. 2, in which a lightweight woven fabric 14 is comprised of nylon yarns 16 of 315D in the warp direction and nylon yarns 18 of 210D in the fill direction. This blend, when coated with a polymeric coating 20 such as polyurethane, as shown in FIG. 3, provides a woven textile air bag fabric of the type shown in FIG. 1, with little or no permeablility, improved packageability and strength, as well as improved coating adhesion properties. In particular, warp yarns 16 and fill yarns 18 are comprised of bundled nylon continuous filaments having little or no twist and held together by a suitable sizing agent such as polyvinyl alcohol, a compound which provides lubricity for weaving. The resulting fabric is as shown with yarns which are actually woven together in close proximity to permit little or no air permeability between the yarns. The greatly enlarged representation in the drawings are presented for illustration purposes whereby the spaces between the yarns are also greatly enlarged. In particular, it has been found that the particular construction of yarn deniers disclosed herein, combined with the stated preferred coating thickness, provides substantial impermeability to fluid under pressure, while retaining high strength, low weight, superior packageability and non-blocking qualities. Moreover, the fabric's puncture resistance can be modified by combining aramid fibers such as Kevlar® into the weave.

In FIG. 3, a significant feature of the weave of FIG. 2 is illustrated by enlarged cross-sectional view, in that the different size yarns create a relatively uneven surface, with small crevices and interstices which more readily promote adhesion of the polyurethane coating 20 to the fabric 14 as shown. Other coating materials such as chloroprene and silicone rubber or the like have been found to adhere to the subject fabric with comparable improvement.

Figure 4:
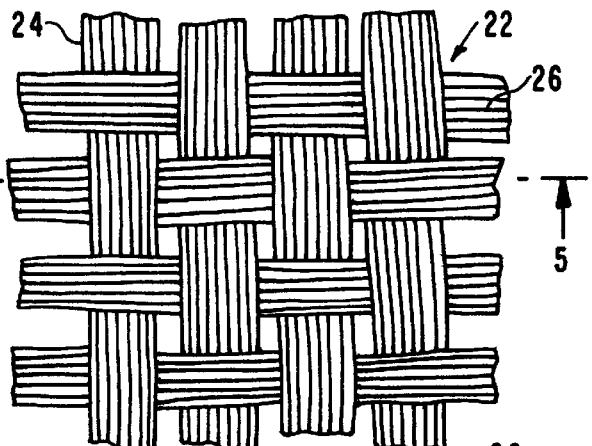
FIG. 4 is a greatly enlarged partial schematic view of an alternative embodiment of the lightweight woven fabric of the invention, comprised of nylon yarns of alternative different deniers.
Figure 5:
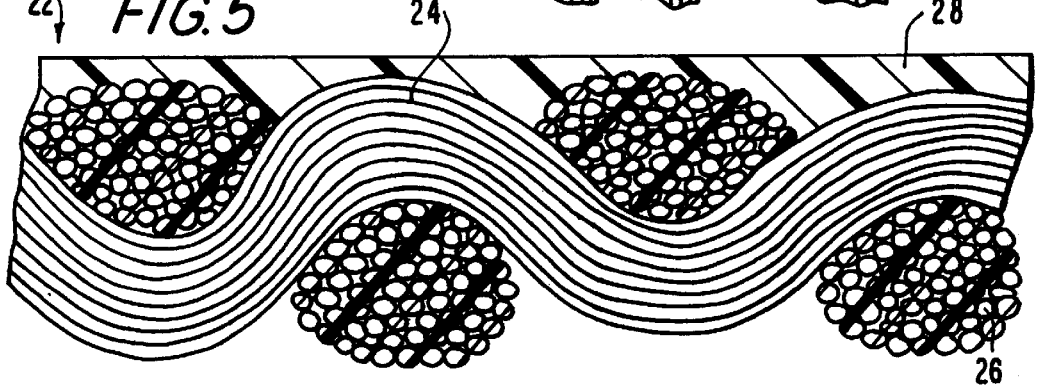
FIG. 5 is a cross-sectional view of the fabric of FIG. 4, taken along line 5—5 of FIG. 4 with a polymeric coating added to one side thereof.

In FIG. 4 there is shown a weave 22 of nylon yarns 24 of 420D in the warp direction and nylon yarns 26 of 315D in the fill direction. This combination of yarn weights would more commonly be used in driver side air bags or side curtains. Moreover, the weave shown in FIG. 4 provides much greater adhesion for coatings than a weave comprised entirely of a yarn of only one denier, as is evident from the enlarged cross-sectional view of the fabric shown in FIG. 5, with coating 28 of polyurethane added thereto on one side. Alternatively, the same type of coating may be placed on the opposite side of the fabric.

Figure 6:
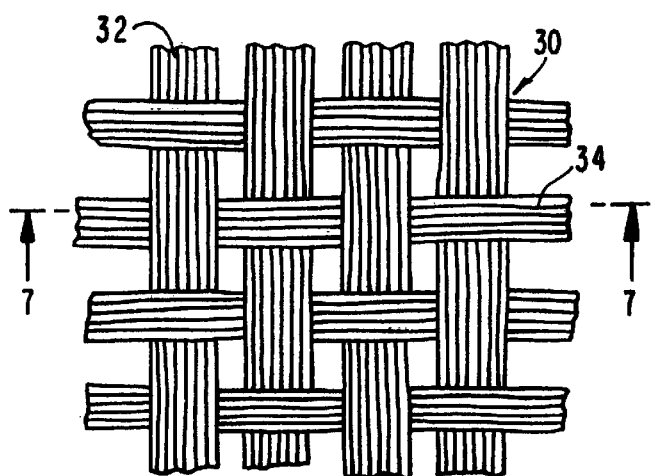
FIG. 6 is a greatly enlarged partial schematic view of another alternative embodiment of the lightweight fabric of the invention, comprised of nylon and aramid yarns of different deniers.

In FIG. 6 there is shown a greatly enlarged view of a woven fabric 30 of nylon and aramid yarns in which the warp yarns 32 are comprised of 310D nylon and fill yarns 34 are aramid yarns such as 195D Kevlar® brand aramid yarns. This weave provides improved adhesion of the polymeric coating by providing peaks and valleys between the yarns, as well as small crevices and interstices therebetween, all facilitated by the combination of different yarn sizes. Also greatly improved puncture resistant properties are provided by the nylon and the aramid yarns which renders the material especially suitable for side curtains. It should be understood that weaves in which the aramid yarns are woven in the warp direction are contemplated in this invention as well.

Figure 7:
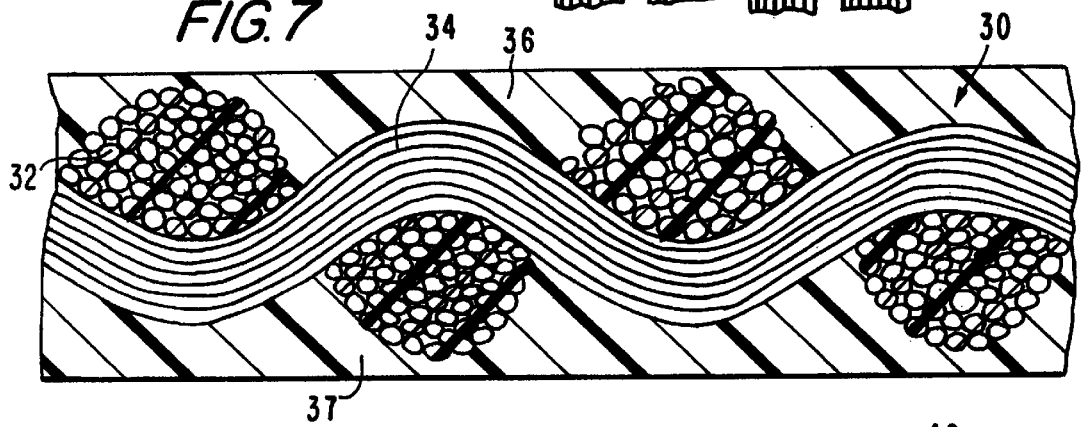
FIG. 7 is a cross-sectional view of the fabric of FIG. 6, taken along line 7—7 of FIG. 6, illustrating an alternative embodiment of the invention wherein a polyurethane coating is added to both sides of the fabric.

Referring to FIG. 7 there is shown a cross-sectional view of the woven fabric shown in FIG. 6, showing the multifilament nylon yarns 32 in cross-section which are greater in size—preferably twice the size—than the Kevlar® fill yarns 34. In FIG. 7, there is also illustrated still another alternative embodiment of the present invention whereby polymeric coatings 36, 37 are respectively added to each side of the fabric as shown. It has been found that the improved adhesion between the fabric 30 and the coatings 36, 37, combined with the combination of yarn sizes as disclosed herein, provides a fabric having little or no fluid permeability without compromising packageability. Accordingly, the fabric shown uncoated in FIG. 6 will provide a finished air bag having superior qualities when coated on both sides in FIG. 7.

Figure 8:
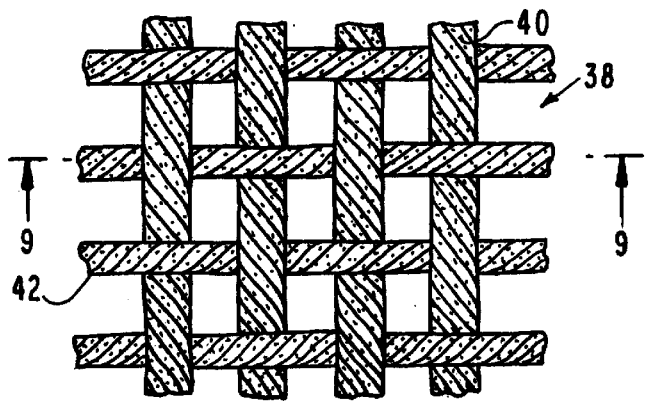
FIG. 8 is a greatly enlarged view of still another alternative embodiment of the lightweight fabric of the invention, comprised of blended yarns of synthetic filamentary materials and natural fibrous materials such as nylon and cotton yarns of different deniers.
Figure 9:
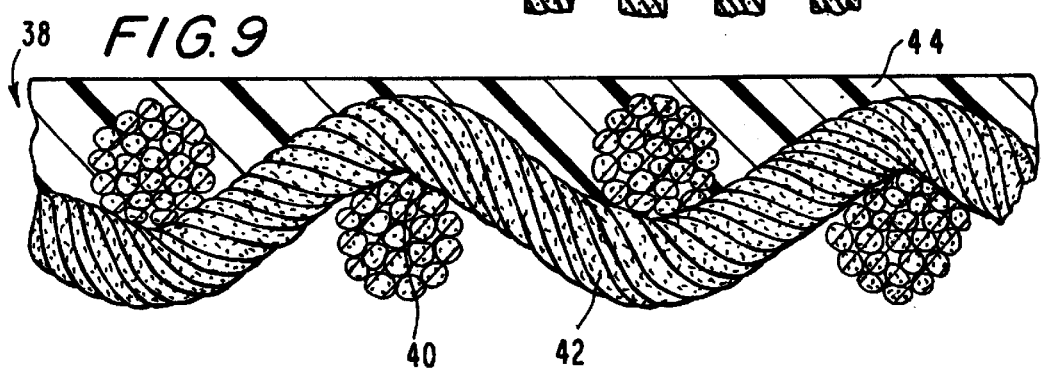
FIG. 9 is a cross-sectional view of the fabric of FIG. 8, taken along line 9—9 of FIG. 8, with a polymeric coating added to one side thereof.

Referring now to FIG. 8, there is shown a top plan view greatly enlarged, of a weave construction 40 of a combination of yarns comprised of warp yarns 40 of 315D nylon continuous filaments blended with cotton fibers with standard twist to retain the fibers and the continuous filaments together in yarn form. In the woven fabric of FIG. 8, the blended yarns 40 in the warp direction are about 315D and the blended yarns 44 in the fill direction are about 160D, or about one half the denier of the blended warp yarns 40. FIG. 9 is a cross-sectional view taken along line 9—9 of FIG. 8, with polyurethane coating 44 added on one side to promote impermeability.

It should be understood that yarns of other synthetic and natural fibers can be used in the invention. In particular, yarns of polyester fibers are contemplated, with weaves of different denier sizes as with nylon. One example of a polyester fabric of the invention would be a weave of 440D polyester with a 650D polyester. Blended yarns of polyester and cotton are also contemplated for use in the invention. Other blends and weaves can also be used in the invention. For example, yarns of different size deniers can be used in either or both of the warp and fill directions. Thus, a weave could comprise both 210D and 315D nylon yarns in either or both of the warp and fill directions. Other denier and fiber combinations are contemplated herein and can be used in the invention.

As can be seen, the present invention provides a coated woven multi-denier textile fabric for use in an air bag or side curtain having substantially improved adhesion and physical properties. Such fabrics may be of the same or different yarns and of two or more deniers. Moreover, as noted, various combinations of yarn deniers and sizes can be utilized in the fabric to control strength and weight factors. For example, as noted, different combinations of yarn deniers can be utilized in both the warp and the fill directions, depending upon the intended application. Moreover, the actual yarns can be comprised of continuous synthetic filaments of different sizes, or filaments and natural or synthetic fibers of different sizes blended to form the yarn.

While the preferred embodiments of the invention have been illustrated and described, using specific terms, such description has been for illustrative purposes only, and it should be understood that changes and variations may be made without departing from the spirit and scope of the invention which is defined by the claims appended hereto.

What is claimed is:

1. A flexible lightweight air bag for receiving and containing fluid under pressure for use in a vehicle air restraint system, which comprises a textile fabric woven of synthetic yarns of at least two different deniers, and a polymeric coating on at least one side of said fabric, said yarns and said polymeric coating being preselected respectively in deniers and thickness so as to render said air bag capable of receiving and retaining fluid under pressure in a vehicle air restraint system, said polymeric coated fabric being substantially impermeable to the fluid.

2. The air bag according to claim 1, wherein said fabric is comprised of warp yarns of about 315D nylon and fill yarns of about 210D nylon.

3. The air bag according to claim 2, wherein said fabric is comprised of warp yarns of about 420D nylon and fill yarns of about 315D nylon.

4. The air bag according to claim 3, wherein said fabric is comprised of warp yarns of from about 315D to about 420D nylon and fill yarns of from about 195D to about 380D aramid.

5. The air bag according to claim 4, wherein said fabric is comprised of warp yarns of at least two different deniers and fill yarns of at least two different deniers.

6. The air bag according to claim 5, wherein said fabric is comprised of warp yarns of from about 210D to about 315D nylon and fill yarns of about 210D nylon.

7. The air bag according to claim 6, wherein said synthetic yarns are selected from the group consisting of nylon, polyester, aramid and graphite and combinations thereof.

8. The coated woven textile fabric according to claim 7, wherein said polymeric coating is comprised of at least one of polyurethane, polysiloxane, polyamide and acrylic type polymers.

9. The coated woven textile fabric according to claim 8, wherein said woven textile fabric is coated on a second side.

10. The coated woven textile fabric according to claim 9, wherein said coating on said second side of said woven textile fabric is at least one of polyurethane, polysiloxane, polyamide and acrylic type polymers.

11. The coated woven textile fabric according to claim 10, wherein each of said coatings has a thickness of from about 0.001 inch to about 0.020 inch.

12. A coated woven textile air bag fabric, which comprises synthetic yarns of at least two different deniers, and a polymer coating on at least one side thereof, said yarns and said polymeric coating being preselected respectively in deniers and thickness so as to render said fabric substantially inpermeable to fluid under pressure.

13. The coated woven textile air bag fabric according to claim 12, wherein said fabric is comprised of warp yarns of about 315D nylon and fill yarns of about 210D nylon.

14. The coated woven textile air bag fabric according to claim 12, wherein said fabric is comprised of warp yarns of about 420D nylon and fill yarns of about 315D nylon.

15. The coated woven textile air bag fabric according to claim 12, wherein said fabric is comprised of warp yarns of from about 315D to about 420D nylon and fill yarns of from about 195D to about 380D aramid.

16. The coated woven textile air bag fabric according to claim 12, wherein said fabric is comprised of warp yarns of at least two different deniers and fill yarns of at least two different deniers.

17. The coated woven textile air bag fabric according to claim 12, wherein said fabric is comprised of warp yarns of from about 210D to about 315D nylon and fill yarns of about 210D nylon.

18. The coated woven textile air bag fabric according to claim 12, wherein said synthetic yarns are selected from the group consisting of nylon, polyester, aramid and graphite and combinations thereto.

19. The coated woven textile air bag fabric according to claim 12, wherein said polymeric coating is comprised of at least one of polyurethane, polysiloxane, polyamide and acrylic polymers.

20. The coated woven textile air bag fabric according to claim 19, wherein said woven textile fabric is coated on a second side.

21. The coated woven textile air bag fabric according to claim 20, wherein said coating on said second side of said woven textile fabric is at least one of polyurethane polysiloxane, polyamide and acrylic polymer.

22. The coated woven textile air bag fabric according to claim 21, wherein each of said coatings has a thickness of from about 0.001 inch to about 0.20 inch.

23. A coated woven textile air bag fabric, which comprises synthetic yarns of at least two different deniers and more than one synthetic filamentary material, and a polymeric coating on at least one side thereof, said yarns and said polymeric coating being preselected respectively in deniers and thickens so as to render said fabric substantially impermeable to fluid under pressure, said filamentary materials being selected to provide predetermined weight and strength for use in inflatable vehicle restraint systems.

24. The coated woven textile air bag fabric according to claim 23, wherein said fabric is comprised of warp yarns of about 315D nylon and fill yarns of about 210D nylon.

25. The coated woven textile air bag fabric according to claim 24, wherein said fabric is comprised of warp yarns of about 420D nylon and fill yarns of about 315D nylon.

26. The coated woven textile air bag fabric according to claim 25, wherein said fabric is comprised of warp yarns of about 315D to about 420D nylon and A fill yarns of from about 195D to about 380D aramid.

27. The coated woven textile air bag fabric according to claim 26, wherein said fabric is comprised of warp yarns of at least two different deniers and fill yarns of at least two different deniers.

28. The coated woven textile air bag fabric according to claim 27, wherein said fabric is comprised of warp yarns of from about 210D to about 315D nylon and fill yarns of about 210D nylon.

29. The coated woven textile air bag fabric according to claim 28, wherein said synthetic yarns are selected from the group consisting of nylon, polyester, aramid and graphite and combinations thereof.

30. The coated woven textile air bag fabric according to claim 29, wherein said polymeric coating is comprised of at least one of polyurethane, polysiloxane, polyamide and acrylic type polymers.

31. The coated woven textile air bag fabric according to claim 30, wherein said woven textile fabric is coated on a second side.

32. The coated woven textile air bag fabric according to claim 31, wherein said coating on said second side of said woven textile fabric is at least one of polyurethane, polysiloxane, polyamide and acrylic type polymers.

33. The coated woven textile air bag fabric according to claim 32, wherein each of said coatings has a thickness of from about 0.001 inch to about 0.20 inch.

34. A flexible air bag, which comprises a fabric having synthetic yarns of at least two different deniers, and a polymer coating on at least one side thereof, said yarns and said polymeric coating being preselected respectively in deniers and thickness so as to render said fabric substantially, impermeable to fluid under pressure.

35. A flexible air bag, which comprises a coated woven textile fabric having synthetic yarns of at least two different deniers and more than one synthetic filamentary material, and a polymeric coating on at least one side thereof, said yarns said polymeric coating being preselected respectively in deniers and thickness so as to render said fabric substantially impermeable to fluid under pressure, said filamentary materials being selected to provide predetermined weight and strength for use in inflatable vehicle restraint systems.

* * * * *